(12) United States Patent
Taniguchi et al.

(10) Patent No.: US 7,318,056 B2
(45) Date of Patent: Jan. 8, 2008

(54) SYSTEM AND METHOD FOR PERFORMING CLICK STREAM ANALYSIS

(75) Inventors: David Taniguchi, Kirkland, WA (US); Kong-Kat Wong, Issaquah, WA (US); Eric A. Reel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 10/261,558

(22) Filed: Sep. 30, 2002

(65) Prior Publication Data

US 2004/0064443 A1    Apr. 1, 2004

(51) Int. Cl.
*G06F 17/30* (2006.01)

(52) U.S. Cl. ............... 707/3; 707/6; 707/10; 707/100; 707/101; 707/102; 705/10; 705/26; 715/513; 709/207; 709/217; 709/224; 709/238

(58) Field of Classification Search ............ 700/3; 709/224, 229, 207, 217, 238; 705/10, 1, 705/29, 77, 26; 707/3, 6, 10, 100, 101, 102; 715/513

See application file for complete search history.

(56) References Cited

U.S. PATENT DOCUMENTS

| | | | |
|---|---|---|---|
| 6,018,619 A | 1/2000 | Allard et al. | |
| 6,073,241 A | 6/2000 | Rosenberg et al. | |
| 6,278,966 B1 | 8/2001 | Howard et al. | |
| 6,334,110 B1 | 12/2001 | Walter et al. | |
| 6,385,619 B1 | 5/2002 | Eichstaedt et al. | |
| 6,393,407 B1 | 5/2002 | Middleton, III et al. | |
| 6,654,735 B1 * | 11/2003 | Eichstaedt et al. | 707/3 |
| 6,691,106 B1 * | 2/2004 | Sathyanarayan | 707/3 |
| 6,850,988 B1 * | 2/2005 | Reed | 709/238 |
| 7,165,105 B2 * | 1/2007 | Reiner et al. | 709/224 |
| 7,251,687 B1 * | 7/2007 | McCullough | 709/224 |
| 2002/0038350 A1 * | 3/2002 | Lambert et al. | 709/217 |
| 2002/0065912 A1 * | 5/2002 | Catchpole et al. | 709/224 |
| 2002/0083067 A1 * | 6/2002 | Tamayo et al. | 707/100 |
| 2002/0171677 A1 * | 11/2002 | Stanford-Clark | 345/738 |
| 2003/0023715 A1 * | 1/2003 | Reiner et al. | 709/224 |
| 2003/0033155 A1 * | 2/2003 | Peerson et al. | 705/1 |
| 2003/0051031 A1 * | 3/2003 | Streble | 709/224 |
| 2003/0187677 A1 * | 10/2003 | Malireddy et al. | 705/1 |
| 2004/0070606 A1 * | 4/2004 | Yang et al. | 345/745 |

* cited by examiner

*Primary Examiner*—Don Wong
*Assistant Examiner*—Sheree N Brown
(74) *Attorney, Agent, or Firm*—Lee & Hayes, PLLC

(57) ABSTRACT

A system and method for performing click stream analysis is described. In one implementation, a Web log is processed to reconstruct a visit made by a user to a Web site. The Web log contains records representing actions performed by the user during the visit including any actions that may be designated a commerce event. A sequential identification is assigned to each record and the sequential identification is stored with the associated record in a database. Any records representing actions performed by the user that are designated as a commerce event are identified. The database is queried for a certain quantity of records representing actions performed by the user prior to and/or subsequent to the commerce event, based on the sequential identification assigned to each record.

32 Claims, 4 Drawing Sheets

SYSTEM AND METHOD FOR PERFORMING CLICK STREAM ANALYSIS

TECHNICAL FIELD

This invention relates to Web servers, and more particularly, to click stream analysis of client interactions with Web servers.

BACKGROUND

Click stream analysis involves the analysis of user actions when visiting a Web site. These actions are stored in a Web server log, where each log record typically corresponds to a single page event. Click stream analysis is intended to aid Web site owners understand how visitors are using their site.

Current click stream analysis products typically provide aggregate path analysis reports, which show general trends of how visitors are using particular Web sites. Unfortunately, in many instances, these reports are unable to gauge particular visitor activity with enough granularity to assist the Web site owner to reconstruct precisely what behavior led visitors to particular actions when visiting the Web site. If the Web site owner desires to reconstruct the more particular user actions, the entire Web server log needs to be scanned, collated and queried, which is often an inefficient, inaccurate and a time consuming process.

SUMMARY

A system and method for performing click stream analysis is described. In one implementation, a Web log is processed to reconstruct a visit made by a user to a Web site. The Web log contains records representing actions performed by the user during the visit including any actions that may be designated a "commerce event". A sequential identification is assigned to each record and the sequential identification is stored with the associated record in a database. Any records representing actions performed by the user that are designated as a "commerce event" are identified. The database is queried for a certain quantity of records representing actions performed by the user prior to and/or subsequent to the "commerce event", based on the sequential identification assigned to each record.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Overview

To overcome inefficiencies and problems described in the Background section, the following description introduces the broad concept of analyzing a user's click activity while visiting a Web site to efficiently ascertain what actions occurred prior to and/or subsequent to a "commerce event". In one described implementation, a "commerce event" is any action performed by a visitor to a Web site that is deemed a point of great interest, because the event typically represents a culmination of a user's navigational journey(s) through a Web site or results in some type of action that determines the outcome of the navigation. For instance, while visiting a Web site a user may purchase a product, click on an advertisement, add an item to a virtual shopping basket: all of which are the type actions that are usually considered a "commerce event", because they represent special or the more interesting actions of a user's click activity.

In an additional implementation there is also the flexibility to permit personnel managing the Web site, to designate additional or alternative actions that they consider to be a "commerce event" on their respective Web site. Thus, a "commerce event" may also be a designated event (i.e., action) that marks a point in a user's click activity in which there is a desire to track and determine what the user's click activity was prior to and subsequent to such a designated action.

Exemplary Network Environment

Figure 1:
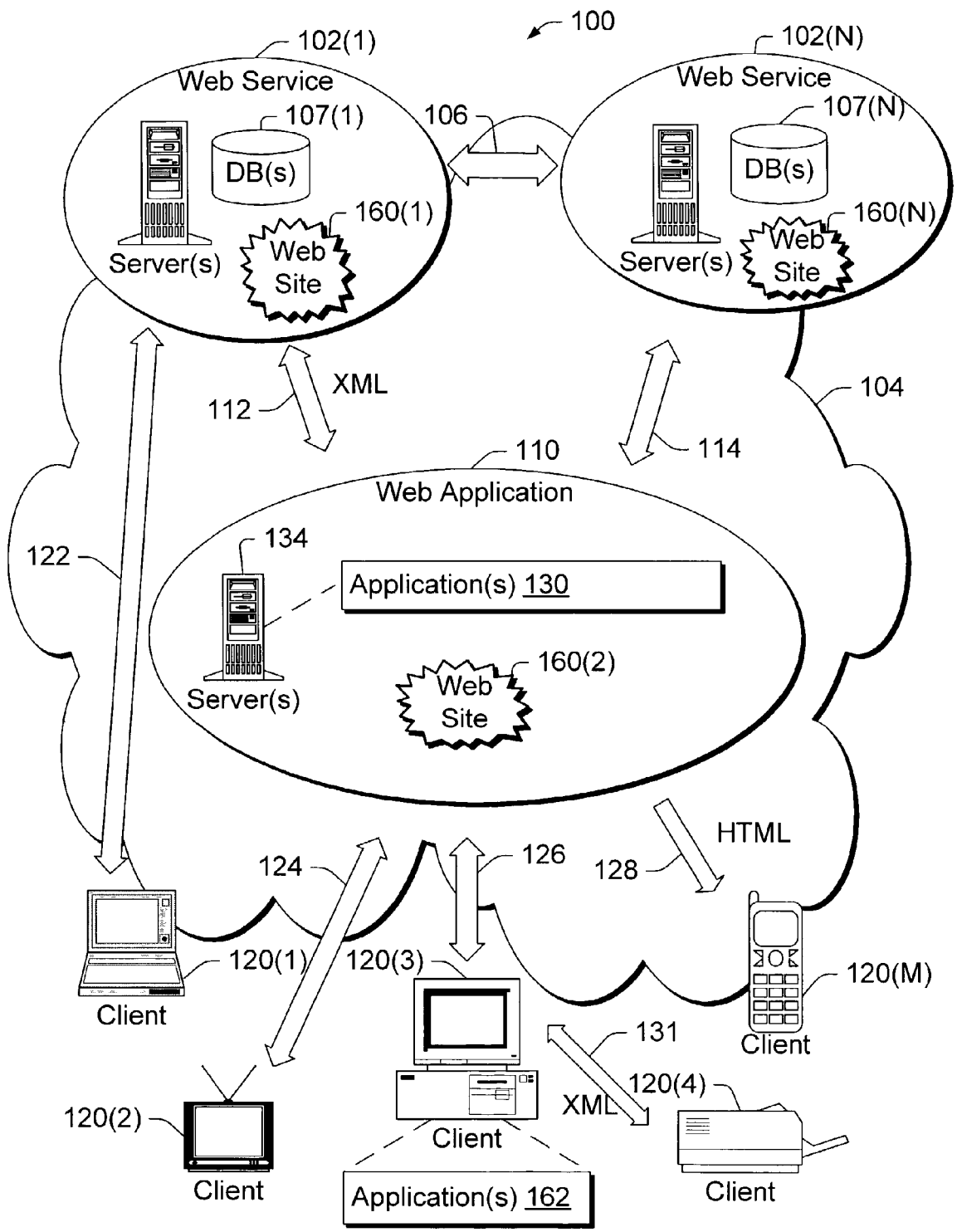
FIG. 1 shows a network environment in which a click stream analysis application may be implemented.

FIG. 1 shows a network environment 100 in which a click stream analysis application 130 may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as Extensible markup language (XML), hypertext transport protocol (HTTP), and simple mail transfer protocol (SMTP), although other means of interacting with the Web services over the network may also be used, such as simple object access protocol (SOAP), remote procedure call (RPC) or object broker type technology.

Web services 102 are accessible directly by other services (represented by communication link 106) or a software application, such as Web service application 110 (as represented by communication links 112 and 114). Each Web service 102 is illustrated as including one or more servers that execute software to handle requests for particular services. Such services often maintain databases 107 that store information to be served back to requesters. Web services may be configured to perform any one of a variety of different services. Examples of Web services include login verification, notification, database storage, stock quoting, location directories, mapping, entertainment, shopping, calendars, news, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The client devices represented generally as number 120 may communicate with one another using standard protocols as well, as represented by an exemplary XML link 131 between clients 120(3) and 120(4).

The client devices 120 can be implemented many different ways. Examples of possible implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on some type of network platform such as one or more server(s) 134. The Web application 110 may utilize Web services 102 when handling and servicing requests from client 120. The Web application 110 is composed of one or more software applications 130 that are executing on one or more servers 134 or other computer systems. Note that a portion of Web application 110 may reside on one or more of clients 120. Alternatively, Web application 110 may coordinate with other software on clients to accomplish tasks. In one exemplary implementation, one of the software applications 130 may include Microsoft's® Commerce Server family of products and/or other application server application programs.

Web application 110 may include the ability to monitor Web services, servers, and/or client devices 120 interactions with one or more Web site(s) 160(1), . . . , 160(N). The Web sites, referred to generally as 160, can operate on Web services 102, servers 134 and/or client devices 120. Web application 110 may also be implemented at a client to monitor Web sites 160. Client 120(3) represents the situation where a Web application 110 including applications 162 (which may be identical to server-based applications 130), but modified for any number of client purposes to monitor interactions with Web sites 160.

Click Stream Analysis—Web Sites, Actions, Commerce Event

Figure 2:
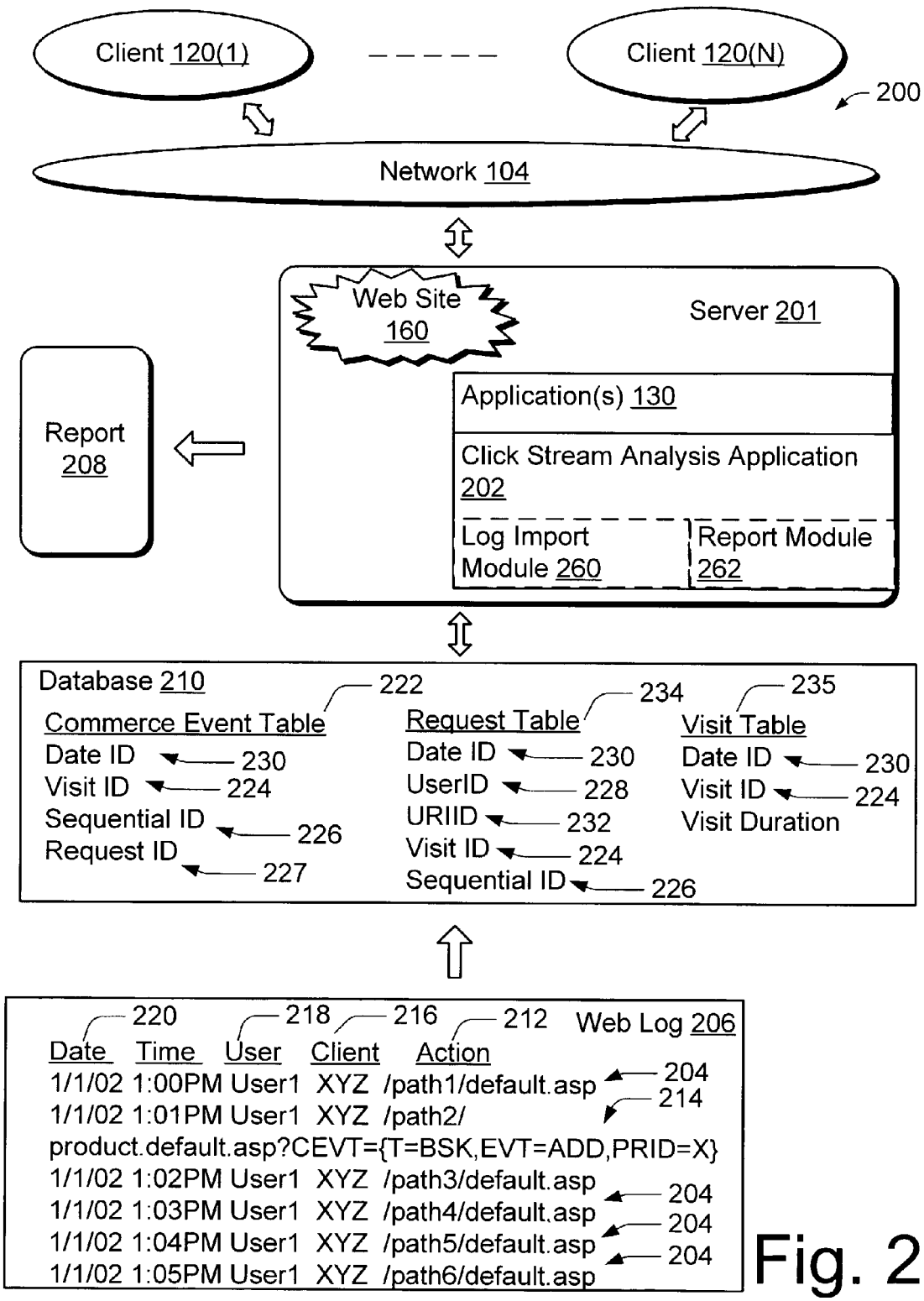
FIG. 2 shows how a server may extract information from a web log and store the information in a database to perform click stream analysis.

FIG. 2 shows a Web site 160 operating on a server 201. Server 201 represents any type of computer device (such as the servers described with reference to FIG. 1) capable of performing functionality associated with hosting a Web site. Web site 160 comprises a set of pages. The pages are linked together allowing a visitor to move from one page another. The arrangement of pages constitutes a part of a Web site's content topology. A page or a set of pages can contain or point to a variety of resources, including images, text, scripts, links to resources and so forth. A user may perform "actions" while on a page of the Web site by "clicking" on a designated location and being linked to a desired location or cause an event to occur. For example, an action may include clicking on and/or interacting with an advertisement, traversing from one page to another, purchasing an item, adding an item to a virtual shopping basket, etc.

Some of the actions performed by a user may also be designated a "commerce event" by one of the software applications 130. As described above, a "commerce event" describes any action performed by a visitor to a Web site that is deemed a point of great interest, because the event typically represents a culmination of a user's navigational journey(s) through a Web site or results in some type of action that determines the outcome of the navigation. For instance, while visiting a Web site a user may purchase a product, click on an advertisement, add an item to a virtual shopping basket: all of which are the type actions that are usually considered a "commerce event," because they represent special or the more interesting actions of a user's click activity. Further, the software applications 130 may also contain the flexibility to permit personnel managing the Web site 160, to designate additional or alternative actions that they consider to be a "commerce event" on their respective Web site. Thus, a "commerce event" may also be a designated event (i.e., action) that marks a point in a user's click activity in which there is a desire to track and determine what the user's click activity was prior to and subsequent to such a designated action.

Each time a user performs an action on the Web site 160, the action invokes one or more applications 130 to log what ever resource, page, advertisement, or other related item was clicked-on as part of a record 204. Each record 204 is stored in a Web log 206. Each record 204 may also contain information such as the type of action 212, whether the action was a designated "commerce event" 214, who visits the Web site 216, historical data (not shown), the time of a visit 218, the date of a visit 220, how the user entered the Web site (not shown), what browsers (not shown) are used to enter the site, a previous Universal Resource Locator (URL) (not shown) that a user viewed that may have enabled the user to visit the site and other information pertinent to tracking a user's interactions with the Web site 160.

In the example of FIG. 2, Web log 206 shows only six actions performed by a single user (User1). The user entered the Web site on Jan. 1, 2002 at 1 PM. User1 added an item to a virtual shopping basket on the second click, denoted as 214. Subsequent to the record 214 containing an action representing a "commerce event", User1 performed four more actions (paths 3-6).

A click stream analysis application 202 (which may be part of the applications 130 of operate in conjunction with applications 130) is able to analyze a user's actions when visiting the web site 160. Click stream analysis application 202 includes a log import module 260 that imports (i.e., extracts) data from the web log 206, parses the data and stores the data in a database 210. Click stream analysis application 202 also includes a reporting module 262 that analyzes information stored in the database 210, and based the analysis produce a detailed click stream analysis report 208; showing a certain quantity of actions performed by users prior to and/or subsequent to one or more "commerce events."

Reports/Database

Typically, report 208 provides analysis concerning the Web log 206 and may be may produced by reporting module 262 by reconstructing visits to the Web site by one or more users. The report 208 identifies a certain quantity of records representing actions performed by a user prior to and/or subsequent to performing one or more actions that are designated as a "commerce event". For example, if the "commerce event" involves purchasing an item from a page on a Web site, the report 208 may show up to five actions performed by a user prior to purchasing the item and up to three actions performed by a user subsequent to purchasing the item. The quantity of actions performed by a user prior to and/or subsequent to performing a "commerce event" can be modified up or down by a Web analyst.

Thus, the report 208 permits personnel (e.g., analyst) monitoring the Web site 160 to gather detailed information on any give user's click activity prior to and subsequent to a "commerce event". The report may be displayed to an analyst on soft form, such as displayed on a client device, or in other formats such as a hard copy printed by a printer.

The report 208 is produced by extracting data from the Web log 206 (performed by log import module 260), populating database 210 with information (also performed by log import module 260) and searches database 210 for user click activity (performed by report module 262) according to default parameters or those requested by a Web site analyst. The database 210 is organized in a fashion to permit the reconstruction of a user's visit from potentially several different servers by focusing-in on actions (those designated a "commerce event") that were performed on the Web site that are of greater importance to analyst. Consequently, analysts can determine the precise behavior (series of actions on which pages) that led a user to perform an action of particular interest (e.g. a "commerce event") or what type of actions occurred after the "commerce event". In one implementation, Microsoft® SQL Server 2000 is used to create and maintain the database 210, although other implementations are not limited to this to particular arrangement.

The example database 210 includes three tables: a Commerce Event table 222, a Request table 234, and a Visit table 235. The Commerce Event table 222 includes information extracted from records 204 in the Web log 206 representing actions that were designated as a "commerce event" (e.g., commerce event 214). The Request table 234 includes information extracted from all records in the Web log 206. The Visit table 235 includes information extracted from the Web log pertaining to visits to the Web site 160 by particular users.

A "visit" as described herein refers to a single sequence of actions, such as pages viewed while at a Web site from a certain period of time the user enters the site, to the visitor exits the site, where each click within the visit does not exceed a given timeout threshold. Click stream analysis application 202, through the log import module 260, is able to infer a visit from the Web site when no hits are received from a particular user after the last previous hit for a default period of time such as 30 minutes. Of course, other durations, shorter or longer, may be selected for purposes of determining a visit. Other methodologies can also be used to infer a visit. For example, if the referring URL is from a different domain than the site you are analyzing, then a visit can be inferred when the URL chain is broken.

Web Log Transformation

Figure 3:
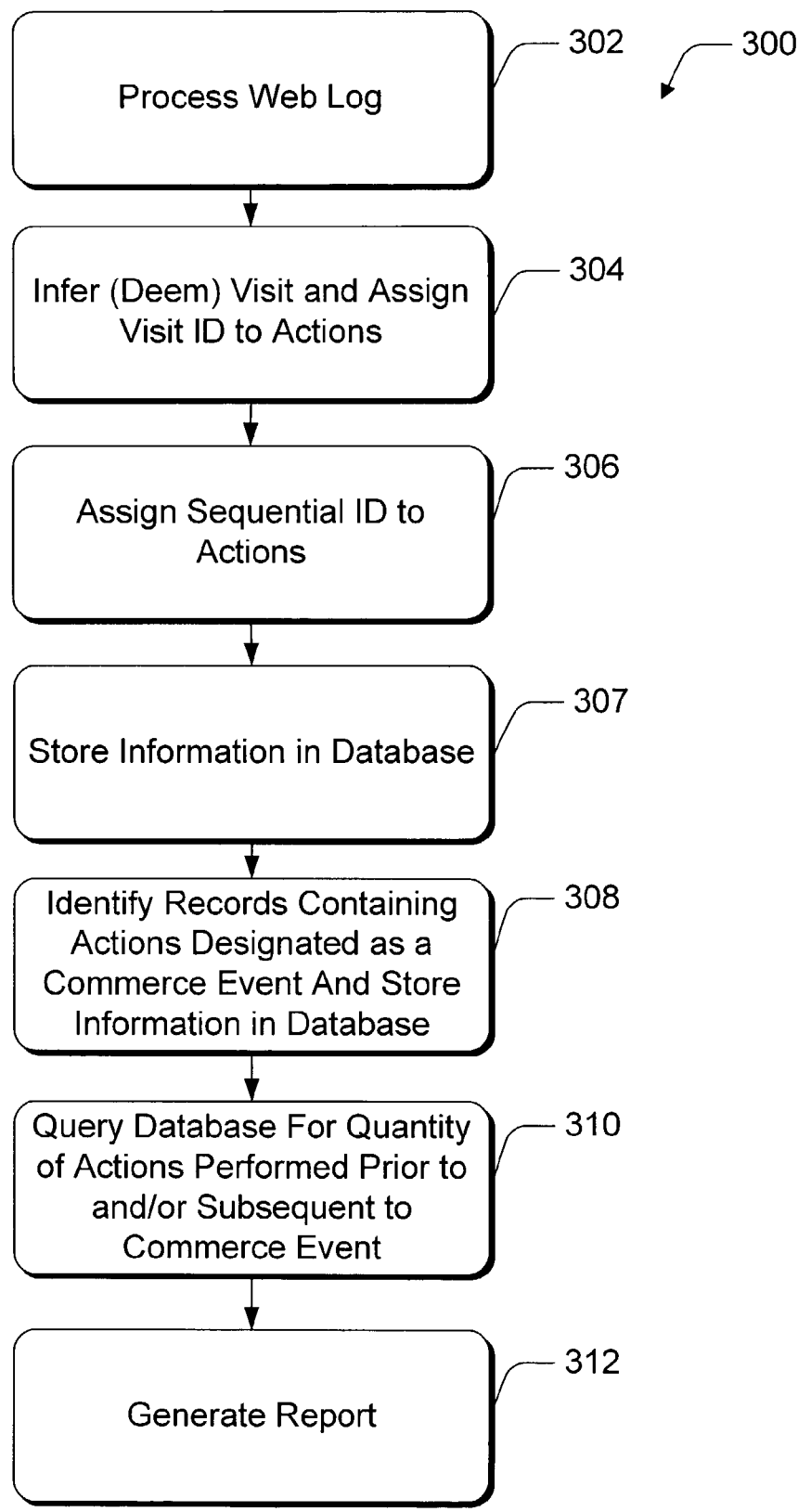
FIG. 3 is a flow chart illustrating an exemplary method for processing a Web log to reconstruct a user's visit to a Web site.

FIG. 3 is a flow chart illustrating an exemplary method 300 for processing a Web log to reconstruct a user's visit to a Web site. Method 300 includes blocks 302-312. The order in which the method is described is not intended to be construed as a limitation. Additionally, portions of the operations may be optional or performed intermittently. Furthermore, the method 300 can be implemented in any suitable hardware, software, firmware, or combination thereof. In the exemplary implementation, method 300 is executed by click stream analysis application 202 in conjunction with software applications 130.

At block 302 a Web log is processed to reconstruct a visit to a Web site by a user. For example, records 204 in Web log 206 are extracted, transformed and loaded into database 210.

At block 304 a visit is inferred by reviewing all records made by a particular user. A "visit" as described above refers to a single sequence of actions, such as pages viewed while at a Web site from a certain period of time the user enters the site, to the visitor exits the site. A visit is inferred from the Web log when no hits are received from a particular user (based on the visitor's ID) after the last previous hit for a default period of time such as 30 minutes. Of course, other durations, shorter or longer, may be selected for purposes of determining a visit. In one implementation it is possible for the period of time used to determine what length of time should be used between the time a user enters a Web site to the time the user exits the Web site, to be determined by personnel managing the Web site. Click stream analysis application 202 permits this time to be selectable. Additionally, a visit may be determined by other techniques as described above.

Once a visit is determined for a collection of actions performed by the same user, a Visit ID 224 is assigned to all such actions. The Visit ID 224 can be an ordinal that advances by one each time a new visit is detected for a particular user to the same Web site. The Visit ID can be stored along with the date and duration of the visit in the Visit table 235.

At block 306 a sequential ID is assigned to each action extracted from the log. The sequential ID is assigned for each request within a visit. This sequential ID 226 is assigned to all actions whether considered a "commerce event" or not. In the example, the sequential ID 226 is ordinal that advances by one for each action performed by a user during a given visit.

At block 307, once the visit ID 224 and/or sequential ID 226 is assigned to a record extracted from Web log 206, individual components of the record are stored in Request table 234. Along with Visit ID and Sequential ID, a User ID 228, Date ID 230, URI ID 232 is also stored in the Request table 234. All such IDs are ordinals for their respective category. For example, User ID #1 refers to visitor ABC. User ID # 2 would refer to a different visitor (e.g., visitor XYZ). Date ID refers to the date assigned to a particular day. (Universal Resource Indicator) URI ID pertains to a page and on which a page event occurred.

At block 308 information pertaining to actions extracted from the Web log 206 that are designated a "commerce event" (e.g., 214) are identified and stored in the Commerce Event table 222. The Date ID 230, Visit ID 224, and Sequential ID associated with the action are also stored in the Commerce Event table 222.

At block 310, database 210 is queried for a quantity of actions performed prior to and/or subsequent to a "commerce event." For example, for the "commerce event" stored in Commerce Event Table 222, actions stored in Request Table 234 can be identified based on the Sequential ID 226 and Visit ID 224 assigned to each action. Since the Visit ID 224 is unique, the Request Table 234 can be quickly searched for all events with a Sequential IDs 226 in proximity to the sequential ID 226 of the "commerce event". For example, if the commerce event sequential ID was five and the visit ID was 10, the click stream analysis application 202 would search only those actions with visit IDs that are equal to 10. Once all actions having a visit ID of 10 are located, the click stream analysis application 202 can identify a certain quantity of actions prior to and/or subsequent to the "commerce event" by finding those actions with a Sequential ID in proximity to the commerce event's Sequential ID. If the desired granularity for quantity of actions desired to be viewed is two, then the click stream analysis application 202 would search for actions having Sequential IDs equal to three and four for actions prior to the "commerce event", and Sequential IDs equal to six and seven for any actions subsequent to the "commerce event".

At a block 312 a report detailing all "commerce events" that occurred on a certain date (or dates depending on how often the Web log is analyzed), and the actions leading up to and/or performed after a commerce event, can be generated based on method 300. Thus, the report (e.g., 208) is able to provide very detailed information on any give user's click activity before and after a "commerce event" occurs.

Exemplary Computing System and Environment

Figure 4:
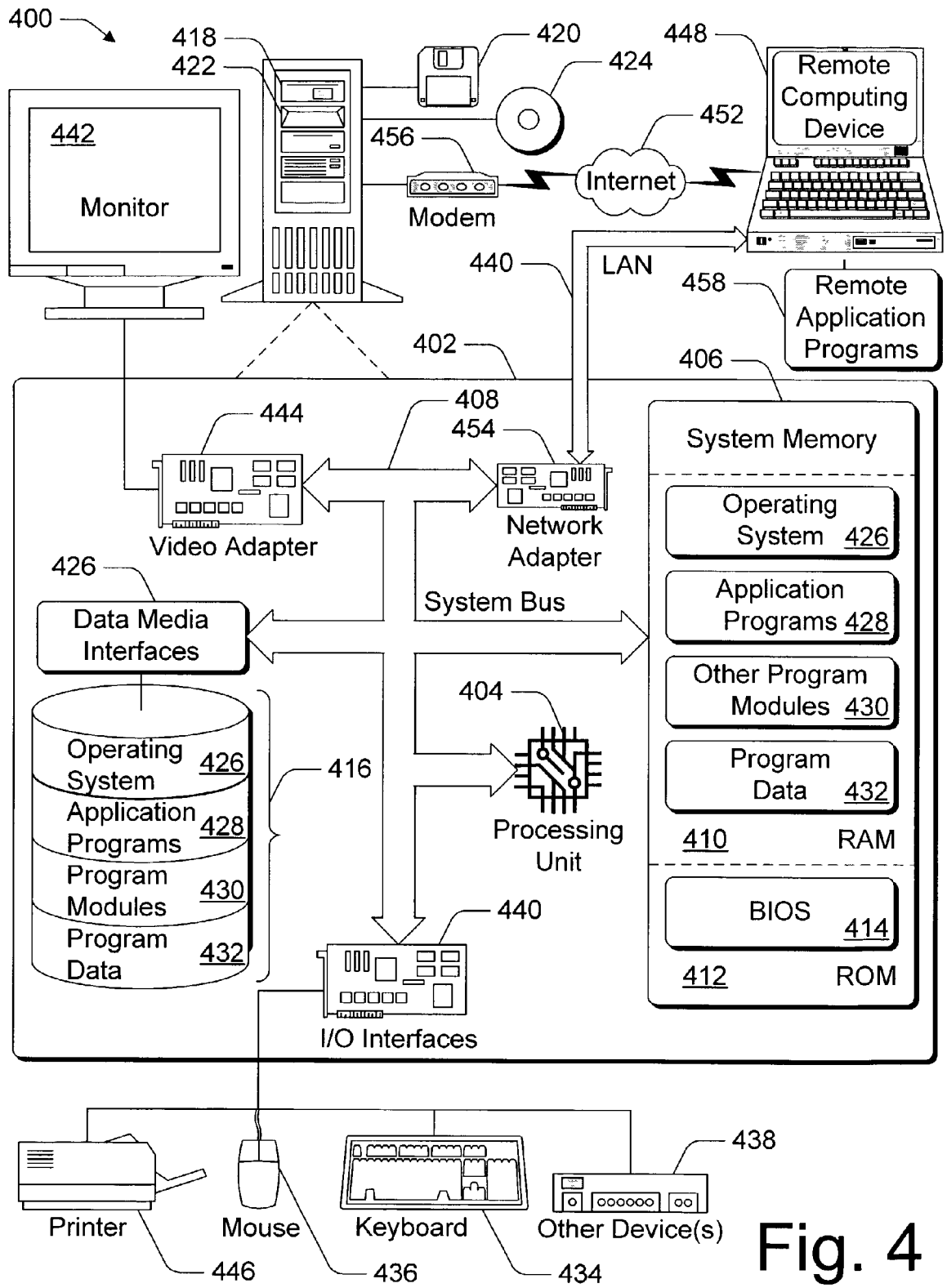
FIG. 4 illustrates an example of a computing environment within which the computer, network, software applications, methods and systems described herein can be either fully or partially implemented.

FIG. 4 illustrates an example of a computing environment 400 within which the applications 130 including click stream analysis application 202 described herein can be either fully or partially implemented. Exemplary computing environment 400 is only one example of a computing system and is not intended to suggest any limitation as to the scope of use or functionality of the network architectures. Neither should the computing environment 400 be interpreted as having any dependency or requirement relating to any one or combination of components illustrated in the exemplary computing environment 400.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The applications 130 (including click stream analysis application 202) may be described in the general context of computer-executable instructions, such as program modules, being executed by a computer. Generally, program modules include routines, programs, objects, components, data structures, etc. that perform particular tasks or implement particular abstract data types. The applications 130 (including click stream analysis application 202) may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing system in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 402 typically includes a variety of computer readable media. Such media can be any available media that is accessible by computer 402 and includes both volatile and non-volatile media, removable and non-removable media. The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 can also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by a SCSI interface (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may include an embodiment of the applications 130 (including click stream analysis application 202).

Computer system 402 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer system 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computer system 402, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for analyzing a click stream, comprising:
processing a Web log to reconstruct a visit to a single Web site by a user in order to ascertain actions occurring prior to or subsequent to a commerce event, the Web log containing records representing actions in the click stream performed by the user during the visit including any actions that are designated a commerce event;
assigning a sequential identification to each record, the sequential identification corresponding to a chronological ordering of the record in relation to other records in the click stream, and storing the sequential identification with the associated record in a database;
identifying any records representing actions performed by the user that are designated as a commerce event, wherein an action is designated as a commerce event if the user performed at least one action during a visit to the Web site of: (i) interacted with an advertisement, (ii) added an item to a basket, (iii) completed a transaction; or (iv) arrived at the Web site through an e-mail advertisement;
querying the database for a certain quantity of records representing actions performed by the user at least one of prior to or subsequent to the commerce event, based on the sequential identification assigned to each record, whereby the query facilitates outputting the certain quantity of records to an analyst;
enabling modification, by the analyst, of the certain quantity of records to be reported relative to the commerce event; and
enabling the analyst to determine which actions performed by the user are to be designated commerce events and to designate alternative actions as commerce events.

2. The method as recited in claim 1, further comprising reporting the certain quantity of records.

3. The method as recited in claim 1, further comprising assigning a visit identification to each record, the visit identification corresponding to the visit to the Web site by the user, and storing the visit identification with the associated record in the database.

4. The method as recited in claim 1, further comprising assigning a user identification to each record, the user identification corresponding to the user, and storing the user identification with the associated record in the database.

5. The method as recited in claim 1, further comprising deeming the visit to the Web site by the user complete if no records are located in the database representing actions performed by the user for a period of time.

6. The method as recited claim 5, wherein the period of time is definable by personnel managing the Web site.

7. The method as recited in claim 1, further comprising assigning a date to each record, the date corresponding to the date the user visited the Web site and storing the date with the associated record in the database.

8. The method as recited in claim 1, further comprising assigning a time to each record, the time corresponding to the time the user performed an action on the Web site and storing the time with the associated record in the database.

9. The method as recited in claim 1, wherein the sequential identification is an ordinal number indicating an order for the actions performed by the user.

10. One or more computer-readable media comprising computer-executable instructions that, when executed, perform the method as recited in claim 1.

11. A system, comprising:
a Web server configured to process a Web log to reconstruct a visit to a single Web site by a user in order to ascertain actions occurring prior to or subsequent to a commerce event, the Web log containing records representing actions performed by the user during the visit including any actions that are designated a commerce event; and
a database configured to store information associated with records;
wherein the Web server is configured to:
(i) assign a sequential identification to each record and store the sequential identification with the associated record in a database;
(ii) identify any records representing actions performed by the user that are designated as a commerce event, wherein an action is designated as a commerce event if the user performed at least one action during a visit to the Web site of: (i) interacted with an advertisement, (ii) added an item to a basket, (iii) completed a transaction; or (iv) arrived at the Web site through an e-mail advertisement;

(iii) query the database for a certain quantity of records representing actions performed by the user at least one of prior to or subsequent to the commerce event, based on the sequential identification assigned to each record, whereby the query facilitates outputting the certain quantity of records; and (iv) enable modification, by an analyst, of the certain quantity of records to be reported relative to the commerce event, and enable the analyst to determine which actions performed by the user are to be designated commerce events and to designate alternative actions as commerce events.

12. The system as recited in claim 11, wherein the Web server is further configured to report the certain quantity of records representing actions performed by the user at least one of prior to or after any of the records representing actions performed by the user that are designated as a commerce event.

13. The system as recited in claim 11, wherein the Web server is further configured to assign a visit identification to each record, the visit identification corresponding to the visit to the Web site by the user and store the visit identification with the associated record in the database.

14. The system as recited in claim 11, wherein the Web server is further configured to assign a user identification to each record, the user identification corresponding to the user and store the user identification with the associated record in the database.

15. The system as recited in claim 11, wherein the Web server is further configured to deem the visit to the Web site by the user complete if no records are located in the database representing actions performed by the user for a period of time.

16. The system as recited in claim 11, wherein the Web server is further configured to deem the visit to the Web site by the user complete if no records are located in the database representing actions performed by the user for a period of time, wherein the period of time is definable by personnel managing the Web site.

17. The system as recited in claim 11, wherein the Web server is further configured to assign a date to each record, the date corresponding to the date the user visited the Web site and storing the date with the associated record in the database.

18. The system as recited in claim 11, wherein the Web server is further configured to assign a time to each record, the time corresponding to the time the user performed an action on the Web site and storing the time with the associated record in the database.

19. The system as recited in claim 11, wherein the sequential identification is an ordinal number indicating an order for the actions performed by the user.

20. A computer system comprising one or more processors and one or more software programs, the one or more software programs configured to reconstruct actions performed by a user while visiting a single Web site in order to ascertain actions occurring prior to or subsequent to a commerce event, by:

assigning a sequential identification and a user identification to each action performed by the user while visiting the Web site including any action that is designated a commerce event;

storing each action along with the sequential identification and the user identification in a database;

querying the database for any action that is designated a commerce event and for each action located from the database that is designated a commerce event, using the sequential identification and the user identification as basis to search the database for a certain quantity of actions that occurred at least one of prior to or subsequent to the commerce event, wherein an action is designated as a commerce event if the user performed at least one action during a visit to the Web site of: (i) interacted with an advertisement, (ii) added an item to a basket, (iii) completed a transaction; or (iv) arrived at the Web site through an e-mail advertisement, whereby the query facilitates outputting the certain quantity of actions; and enabling modification, by an analyst, of the certain quantity of records to be reported relative to the commerce event; and enabling the analyst to determine which actions performed by the user are to be designated commerce events and to designate alternative actions as commerce events.

21. The system as recited in claim 20, wherein the one or more software programs is further configured to reconstruct actions performed by a user while visiting a Web site by reporting the certain quantity of actions performed by the user at least one of prior to or after the commerce event.

22. The system as recited claim 20, wherein the one or more software programs is further configured to reconstruct actions performed by a user while visiting a Web site by assigning a visit identification to each action performed by the user while visiting the Web site including any action that is designated a commerce event.

23. The system as recited claim 20, wherein the one or more software programs is further configured to reconstruct actions performed by a user while visiting a Web site by assigning a user identification to each action performed by the user while visiting the Web site including any action that is designated a commerce event.

24. One or more computer-readable media having stored thereon computer executable instructions that, when executed by one or more processors, causes the one or more processors of a computer system to:

process a Web log to reconstruct a visit to a single Web site by a user in order to ascertain actions occurring prior to or subsequent to a commerce event, the Web log containing records representing actions performed by the user during the visit including any actions that are designated a commerce event;

assign a sequential identification to each record and storing the sequential identification with the associated record in a database;

identify any records representing actions performed by the user that are designated as a commerce event, wherein an action is designated as a commerce event if the user performed a at least one action during a visit to the Web site of: (i) interacted with an advertisement, (ii) added an item to a basket, (iii) completed a transaction; or (iv) arrived at the Web site through an e-mail advertisement;

query the database for a certain quantity of records representing actions performed by the user at least one of prior to or subsequent to the commerce event, based on the sequential identification assigned to each record, whereby the query facilitates outputting the certain quantity of records to an analyst; and enable modification, by the analyst, of the certain quantity of records to be reported relative to the commerce event; and enable the analyst to determine which actions performed by the user are to be designated commerce events and to designate alternative actions as commerce events.

25. One or more computer-readable media as recited in claim 24, further comprising computer executable instructions that, when executed, direct the computer system to report the certain quantity of records.

26. One or more computer-readable media as recited in claim 24, further comprising computer executable instructions that, when executed, direct the computer system to assign a visit identification to each record, the visit identification corresponding to the visit to the Web site by the user and store the visit identification with the associated record in the database.

27. One or more computer-readable media as recited in claim 24, further comprising computer executable instructions that, when executed, direct the computer system to assign a user identification to each record, the user identification corresponding to the user and storing the user identification with the associated record in the database.

28. One or more computer-readable media as recited in claim 24, further comprising computer executable instructions that, when executed, direct the computer system to deem the visit to the Web site by the user complete if no records are located in the database representing actions performed by the user for a period of time.

29. One or more computer-readable media as recited in claim 24, further comprising computer executable instructions that, when executed, direct the computer system to deem the visit to the Web site by the user complete if no records are located in the database representing actions performed by the user for a period of time, wherein the period of time is definable by personnel managing the Web site.

30. One or more computer-readable media as recited in claim 24, further comprising computer executable instructions that, when executed, direct the computer system to assign a date to each record, the date corresponding to the date the user visited the Web site, and store the date with the associated record in the database.

31. One or more computer-readable media as recited in claim 24, further comprising computer executable instructions that, when executed, direct the computer system to assign a time to each record, the time corresponding to the time the user performed an action on the Web site, and store the time with the associated record in the database.

32. One or more computer-readable media as recited in claim 24, wherein the sequential identification is an ordinal number indicating an order for the actions performed by the user.

\* \* \* \* \*